Patented Nov. 16, 1943

2,334,200

UNITED STATES PATENT OFFICE 2,334,200

NAPHTHALENE DERIVATIVES AND METHOD OF OBTAINING SAME

Wilbur F. Kamm, Grosse Pointe, and Benjamin F. Tullar, Grosse Pointe Woods, Mich., assignors to Parke, Davis & Company, Detroit, Mich., a corporation of Michigan No Drawing. Application February 23, 1940, Serial No. 320,424

9 Claims. (Cl. 167—81)

The invention relates to new and valuable amino naphthol compounds and methods for obtaining the same.

Recently a number of antihemorrhagic substances have been discovered having the chemical structure of 1,4 naphthoquinone. Quite a variety of alkyl substituted 1,4 naphthoquinones have been found to have, in some degree, the property of reducing the coagulation time of the blood of animals and patients whose blood shows an abnormally long period of time before coagulation occurs. However, only a few of such naphthoquinone derivatives have been found to have an activity comparable to the natural antihemorrhagic vitamin obtainable by solvent extraction from vegetable sources such as alfalfa. Moreover, practically all of the products thus far found having high antihemorrhagic activity are water-insoluble.

It is an object of the present invention to provide a new class of chemical substances, as well as products obtainable therefrom which are highly effective antihemorrhagically and which can be administered either in oil solution or in aqueous solution. Another object of the invention is to supply preparations which are stable and can be put up in various forms for administration, either orally or by injection.

We have discovered a new class of chemical compounds which may be designated as 4-amino-1-hydroxy naphthalene derivatives and their salts having a methyl group substituted at position 2 or position 3 of the naphthalene nucleus. We have also found that compounds from the new class mentioned have antihemorrhagic properties and are useful as therapeutic agents, and as intermediates for pharmaceutically valuable products.

The type formula for our compounds may be represented as follows:

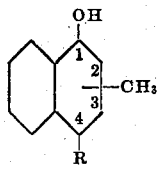

where R is a radical of the group amino and water solubilizing ammonium-type salt radicals derived therefrom.

The invention will be more fully illustrated by reference to the following examples:

EXAMPLE 1.—*2-methyl-4-amino-1-naphthol and its salts*

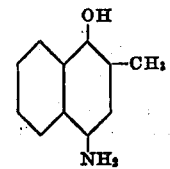

2-methyl-4-amino-1-naphthol 8.5 grams of 2-methyl-1,4-naphthoquinone and 3.5 grams of hydroxylamine hydrochloride are mixed with 85 cc. of pyridine and the mixture allowed to stand for two days. It is then poured into a mixture of 800 grams of ice and 200 cc. of concentrated hydrochloric acid. As soon as the ice has melted, the cool mixture is filtered. The residue on the filter is then taken up in about 1 liter of 40% alcohol, treated twice with charcoal, followed by filtration, and the alcoholic filtrate finally concentrated and crystals of the monoxime of 2-methyl-1,4-naphthoquinone separated out. The monoxime melts at 165–166° C.

6.2 grams of the monoxime of 2-methyl-1,4-naphthoquinone are taken up in 100 cc. of absolute alcohol, 0.2 gram of platinum oxide catalyst added and the mixture shaken with hydrogen under pressure. After a sudden drop in hydrogen pressure, there is no further drop during a period of 10 minutes. The mixture is then filtered to remove the catalyst, and the filtrate is treated with decolorizing charcoal and again filtered. 8 cc. of 5-normal alcoholic hydrochloric acid is then added to the filtrate and, thereafter, sufficient ether is added to cause separation of crystals of 2-methyl-4-amino-1-naphthol hydrochloride. The cool solution is filtered, washed with alcohol-ether mixture and then dried in vacuo to give white crystals of 2-methyl-4-amino-1-naphthol hydrochloride melting at 272–280° C. with decomposition.

A sample of the hydrochloride of this example is neutralized with dilute alkaline solution, such as sodium carbonate solution, and the insoluble free base which crystallizes out is filtered off and dried out of contact with air and sunlight. The crystals consist of pure 2-methyl-4-amino-1- naphthol free base melting at 150–152° C. The hydrochloride and the free base of this example can be represented by the following formulas:

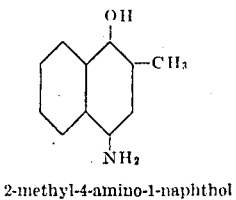

2-methyl-4-amino-1-naphthol

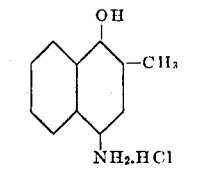

Hydrochloride of 2-methyl-4-amino-1-naphthol

The transformations occurring in this example are briefly indicated by the following diagram.

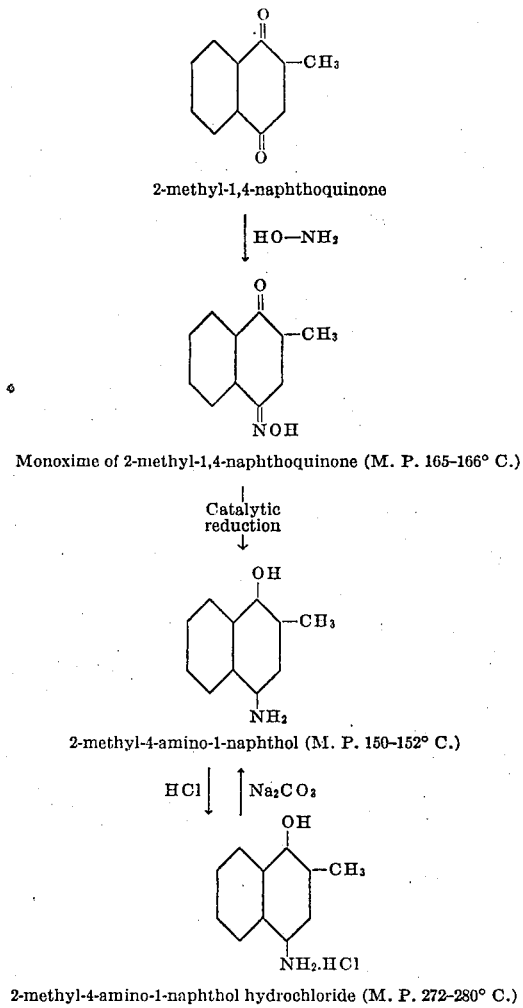

Instead of using catalytic hydrogenation in this example to reduce the monoxime of 2-methyl-1,4-naphtho-quinone to 2-methyl-4-amino-1-naphthol, one can use sodium hydrosulfite ($Na_2S_2O_4$) as a reducing agent. The various reagents used in the above example serve to indicate the type of compounds necessary to bring about the transformations indicated. Various equivalent reagents can, of course, be used by those skilled in the art, in addition to those specifically mentioned.

The free base of this example can be put up in vegetable oil solution, such as olive, peanut or coccanut oil solutions, for oral administration and is useful in such form as an antihemorrhagic agent. The hydrochloride of this example has the advantage that it is water soluble and can be administered orally or by injection in order to decrease the blood coagulation time in patients who are deficient in antihemorrhagic vitamins.

By using another acid, such as sulfuric or phosphoric, or other mineral acid, or carboxylic acids, such as lactic acid, oxalic acid, tartaric acid, etc., instead of the hydrochloric acid used in this example, one can obtain other water soluble salts corresponding to the 2-methyl-4-amino-1-naphthol hydrochloride described above. For example, the phosphate of 2-methyl-4-amino-1-naphthol can be obtained and has a melting point of 209–210° C. Some other salts of this amino naphthol are,

| Salt: | Melting point, °C. |
|---|---|
| Tartrate | 183 (with decomp.) |
| Nitrate | 141–142 |
| Oxalate | 217 (decomp.) |
| Malate | 197–198 |
| Citrate | 195–196 |

EXAMPLE 2.—*3-methyl-4-amino-1-naphthol and its salts (from 1-amino-2-methyl-naphthalene)*

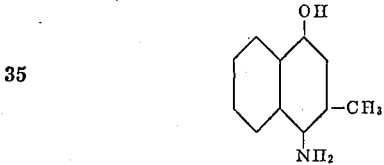

3-methyl-4-amino-1-naphthol

Diazotized sulfanilic acid is first prepared for reaction with 1-amino-2-methyl naphthalene as follows. 34.5 grams of sulfanilic acid are mixed with 20 cc. of 10 N sodium hydroxide and a solution of 16 grams of sodium nitrite in 200 cc. of water is added. This mixture is added slowly and while stirring vigorously to a mixture of 150 cc. of concentrated sulfuric acid in 700 grams of ice. After stirring the reaction mixture for 30 minutes to complete the crystallization of the diazotized sulfanilic acid, it is filtered on a suction filter, washed with water and sucked dry.

The diazotized sulfanilic acid is added with vigorous stirring to 25 grams of 1-amino-2-methyl naphthalene hydrochloride in 1 liter of water and stirred for 1 hour. A sufficient quantity of sodium hydroxide solution to dissolve the azo dye coupled-product is added and the sodium salt of 3-methyl-4-amino-1-naphthalene diazobenzene sulfonic acid salted out by adding sodium chloride. The salted out product is then filtered off.

25 grams of the sodium salt of the sulfonic acid thus obtained are suspended in 300 cc. of boiling acetic anhydride, 700 cc. of acetic acid added, and the mixture boiled for 1 hour. A clear solution is obtained from which the acetic acid and its anhydride are distilled off in vacuo. The residue is the sodium salt of 3-methyl-4-acetylamino-1-naphthalene diazobenzene sulfonic acid. This residue is dissolved in 400 cc. of hot water and the free acid precipitated from the solution by adding 1 equivalent of hydrochloric acid. To this mixture there is then added 1 equivalent of ethanol amine and 25 grams of NaCl to form the are dissolved in 25 cc. of alcohol and added to a solution of 1 gram of ammonium chloride in 10 grams of water and the mixture heated to 65–70° C. 15 grams of zinc are added to the heated solution over a period of about 17 minutes. The reaction mixture is filtered, the solid on the filter washed with alcohol and the filtrate poured into 200 cc. of cold water. The precipitate of 1-hydroxylamino-2-methyl-naphthalene is filtered off, sucked dry on the filter and washed with petroleum ether. It can be taken up in benzol and crystalized therefrom by concentration of the benzol solution to give a pure product melting at 97–98° C.

The 1-hydroxylamino-2-methyl-naphthalene is rearranged into 3-methyl-4-amino-1-naphthol as follows. 5 grams of 1-hydroxylamino-2-methyl-naphthalene are added to 80 cc. of dilute sulfuric acid (5 grams of concentrated $H_2SO_4$ in 75 grams water) at 0° C. The mixture is allowed to stand for 1 hour during which time the insoluble sulfate of 3-methyl-4-amino-1-naphthol separates out. The mixture is made alkaline with sodium hydroxide solution and the alkaline solution extracted with ether. The extracted solution is then neutralized with dilute sulfuric acid, whereupon the crystalline 3-methyl-4-amino-1-naphthol free base precipitates out. The pure free base has a melting point of 202–203° C. If the product is not sufficiently pure, it may be taken up in dilute hydrochloric acid, the solution extracted with ether and then neutralized with sodium carbonate solution to separate out the free base. The free base can then be crystallized again from alcohol.

The 3-methyl-4-amino-1-naphthol free base of Examples 2 and 3 can be converted into its ammonium type salts by neutralizing the free base as described under Example 2. Various salt-forming acids can be used for this purpose. For example, hydrochloric acid gives a hydrochloride of melting point 310–315° C., which is soluble in cold water to the extent of about 1.5%, while sulfuric acid gives a sulfate in the form of colorless needles which darken at 270° C. and char at about 300° C. and is only slightly soluble in water. Other salts of 4-amino-3-methyl-1-naphthol can be made in the same manner. Most of the ammonium type salts, such as the phosphate, nitrate, sulfamate, citrate and tartrate, etc., are water-soluble and give clear aqueous solutions.

The reactions of this example are indicated by the following,

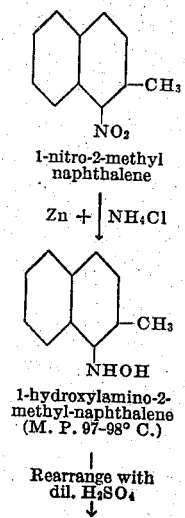

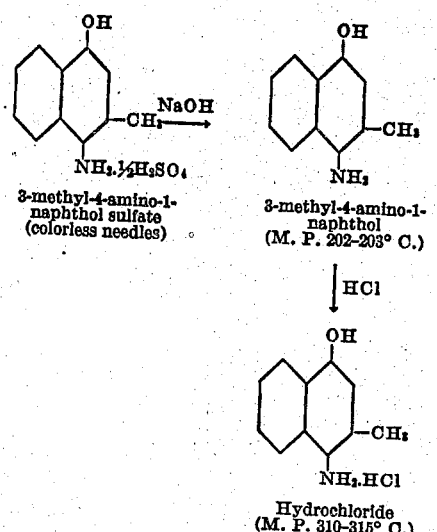

EXAMPLE 4.—*2-methyl-4-amino-1-naphthol and its salts (from 1-nitro-3-methyl-naphthalene)*

A quantity of 1-nitro-3-methyl-naphthalene is converted to 3-methyl-1-hydroxylamino-naphthalene with zinc and ammonium chloride in a manner analogous to that described for the isomeric nitro compound of Example 3. The methyl-hydroxylamino-naphthalene is then rearranged with dilute acid to give 2-methyl-4-amino-1-naphthol identical with the 2-methyl-4-amino-1-naphthol of Example 1.

EXAMPLE 5.—*3-methyl-4-amino-1-naphthol (from 1-amino-3-methyl-naphthalene)*

3.2 grams of 1-amino-3-methyl-naphthalene (melting point 51–52° C.) are suspended in 50 cc. of 6N $H_2SO_4$ and cooled to 0° C. 1.5 grams of sodium nitrite in 15 cc. of water are added slowly while stirring the cold suspension at 0–5° C. When diazotization is completed, the reaction mixture is poured slowly into boiling 50% sulfuric acid and the mixture boiled for 15 minutes. It is then cooled to 0° C., filtered and the residue from the filtration extracted with dilute sodium hydroxide solution. The solution is then charcoaled and the filtrate acidified to cause separation of 3-methyl-1-naphthol.

3.2 grams of 3-methyl-1-naphthol are dissolved in 200 cc. of N/10 sodium hydroxide solution and 5 grams of moist, freshly diazotized sulfanilic acid added, while stirring well to complete the reaction of coupling the naphthol with the diazotized sulfanilic acid. The coupled product is separated almost quantitatively by adding about 25 grams of NaCl to the solution. The coupled product is neutralized with dilute hydrochloric acid and reacted with 1% aqueous solution of ethanol amine. The ethanol amine salt which forms is salted out with NaCl.

8 grams of the ethanol amine salt of 4-(4′-sulfonobenzeneazo) - 3 - methyl - 1-naphthol are suspended in 250 cc. of absolute ethyl alcohol, 0.5 gram of Raney nickel catalyst added and the mixture reduced at 80–90° under 60 lbs. hydrogen pressure for two hours. After filtering off the catalyst and the ethanol amine salt of sulfanilic acid, one-half of the filtrate is concentrated in vacuo to 25 cc., diluted with 50 cc. of hot water and treated with decolorizing charcoal. The charcoal mixture is filtered and the filtrate cooled to form crystals of 4-amino-3-methyl-1-naphthol which are filtered off and dried. The crystals have a melting point of 203° C.

crystalline ethanol amine salt of 3-methyl-4-acetylamino-1-naphthalene diazobenzene sulfonic acid. A gelatinous precipitate, instead of crystals, will form unless NaCl is used. The crystals are filtered off and dried in air.

The reduction of the ethanol amine salt of 3-methyl-4-acetylamino-1-naphthalene diazobenzene sulfonic acid to give 3-methyl-4-acetylamino-1-naphthyl amine is carried out as follows. 25 grams of the ethanol amine salt are mixed with 250 cc. of absolute ethyl alcohol and 1 gram of Raney nickel catalyst and then treated with hydrogen under pressure at 80–90° C. for a period of 3 hours. The hydrogenated mixture is cooled and filtered to remove the catalyst and most of the ethanol amine salt of sulfanilic acid which separates out during the reduction. The filtrate is diluted with an equal volume of water and cooled to cause crystallization of the 3-methyl-4-actylamino-1-naphthyl amine. The latter compound is filtered off and dried in the air to give 10 grams of cotton-like needles of melting point 190–192° C. after preliminary softening at 120° C.

The 1-amino group of this compound of melting point 190–192° C. is diazotized and converted to a hydroxyl group as follows.

2 grams of 3-methyl-4-acetylamino-1-naphthyl amine are added to a mixture of 3.3 cc. of concentrated sulfuric acid and 13 grams of ice. To the cool solution thereby obtained there is slowly added 1 gram of sodium nitrite in 3 cc. of water. An insoluble sulfate forms but gradually dissolves to give a clear solution as the diazotization is completed. The solution from the diazotization is then added slowly to 20 cc. of 50% sulfuric acid solution. The mixture is allowed to stand until the evolution of nitrogen ceases. The product is diluted with 2 volumes of ice water, treated with charcoal, and filtered to give a colorless solution and then neutralized with sodium carbonate solution to precipitate out 3-methyl-4-amino-1-naphthol. The latter product is filtered off and may, if desired, be recrystallized from dilute alcohol. It has a melting point of 203° C.

The transformations of this example may be illustrated as follows.

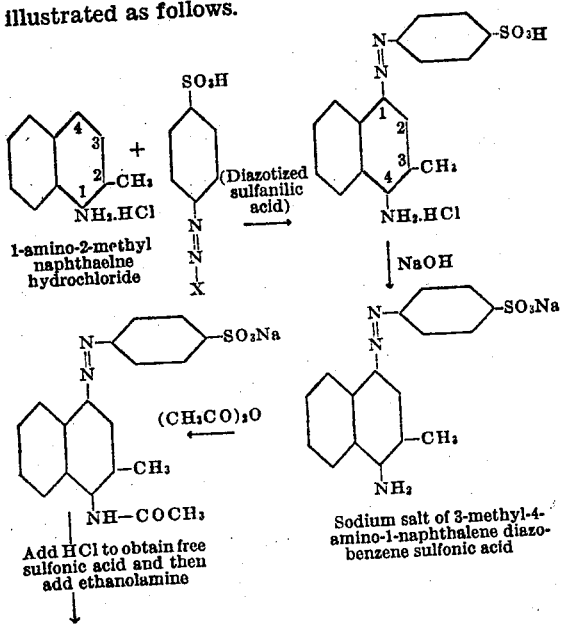

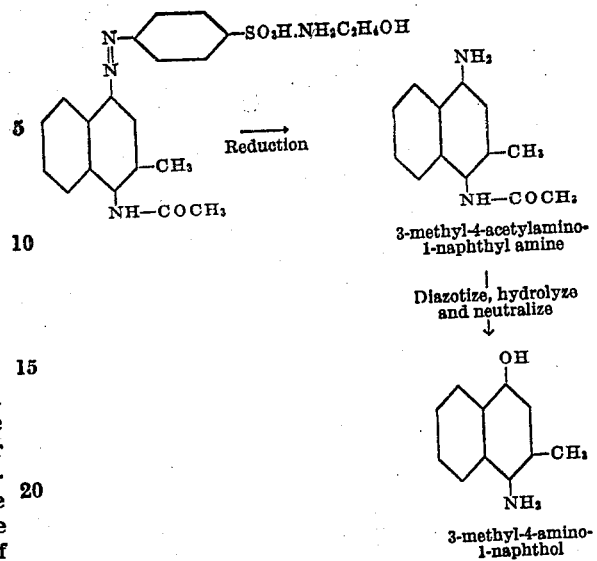

The hydrochloride of the 3-methyl-4-amino-1-naphthol of this example can be made by neutralizing the free base and is a white crystalline product soluble in water. The free base or the salts of this example can be administered in the same way as described for the products of Example 1.

In addition to the hydrochloride, other salts of 3-methyl-4-amino-1-naphthol can be made by reacting the free base with the appropriate acid. For example, sulfuric acid, malonic acid, ascorbic acid, oxalic acid and the like can be used to obtain the corresponding salts.

In this example, the ethanolamine salt of the coupled diazo sulfonic acid is used, because it has the advantage of forming an insoluble ethanol amine salt of sulfanilic acid which is readily separated, along with catalyst, from the desired 3-methyl-4-acetylamino-1-naphthyl amine. However, other salts of the azo-coupled product can be used and the desired naphthyl amine separated from the sulfanilic acid by means of differences in solubility.

Other variations can also be practiced. For example, it is not necessary to use catalytic reduction. Other methods of reduction can be employed, such as reduction with alkali hydrosulfite.

Like the free base and its salts described under Example 1, the 3-methyl substituted product of this example can be directly used for its antihemorrhagic effect or it can be dissolved and utilized in oil or other suitable non-toxic solvents, or dissolved and used in aqueous solution in the form of its ammonium type salts with organic and inorganic acids, or as the free base in alkaline solution.

When the 2-methyl-4-amino-1-naphthol free base of Example 1, or the 3-methyl-4-amino-1-naphthol of this example, are used in the form of their aqueous solutions, it is to be understood herein and in the appended claims that, unless otherwise specified, a solution of either of these bases in alkaline solution is referred to. We prefer to use a minimum of alkaline substance in making up aqueous solutions of these free bases, since an excess of alkali tends to render the solutions more liable to oxidation.

EXAMPLE 3.—*3-methyl-4-amino-1-naphthol and its salts (from 1-nitro-2-methyl-naphthalene)*

12.5 grams of 1-nitro-2-methyl-naphthalene

The other half of the filtrate containing 4-amino-3-methyl-1-naphthol is treated with excess alcoholic HCl, ether added and the mixture cooled. The hydrochloride of 4-amino-3-methyl-1-naphthol crystallizes out and after separating it and drying, it has a melting point of 312–315° C.

Instead of reducing the coupled product of this example by use of catalytic reduction, sodium hydrosulfite may be used. Furthermore, it is not necessary to form the ethanol amine salt of the coupled product before reducing the same to the amino-methyl-naphthol.

The transformations of this example may be illustrated by the following:

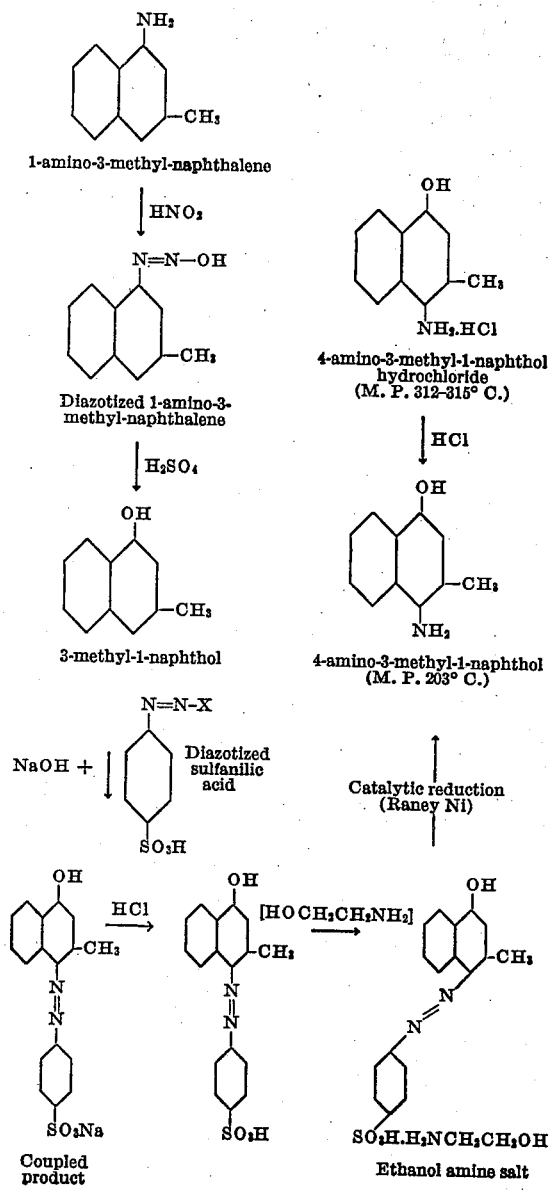

EXAMPLE 6.—2-methyl-4-amino-1-naphthol (from 1-amino-2-methyl-naphthalene)

The starting material for this example is the same as that of Example 2 but the method of treatment is different and the final product is isomeric with the product of Example 2 and identical with the products of Examples 2, 3 and 5. The method used is a variation of that used in Example 5.

A quantity of 1-amino-2-methyl-naphthalene is treated in acid solution with a solution of sodium nitrite to diazotize the 1-amino-2-methyl-naphthalene and thereafter boiled with 50% sulfuric acid solution to hydrolyze the diazotized product and convert it into 2-methyl-1-naphthol. The 2-methyl-1-naphthol is then coupled with diazotized sulfanilic acid and the coupled product, corresponding to and isomeric with the 4-(4'-sulfonobenzeneazo)-3-methyl-1-naphthol of Example 5, is treated with sodium hydrosulfite ($Na_2S_2O_4$) to reduce it to 2-methyl-4-amino-1-naphthol. The 2-methyl-4-amino-1-naphthol is separated by neutralizing the reaction mixture. It is filtered off, washed and dried, and is identical with the 2-methyl-4-amino-1-naphthol of Example 1.

What we claim as our invention is:

1. The class of compounds having the formula,

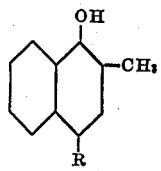

where R is a radical of the group consisting of primary amino and its corresponding water-solubilizing ammonium-type acid addition salt radicals.

2. Compounds of the class consisting of 2-methyl-4-amino-1-naphthol, 3-methyl-4-amino-1-naphthol, and ammonium-type acid addition salts of the same.

3. 2-methyl-4-amino-1-naphthol.

4. An antihemorrhagic composition comprising an aqueous solution of an ammonium-type acid addition salt of 2-methyl-4-amino-1-naphthol suitable for hypodermic injection.

5. 2-methyl-4-amino-1-naphthol hydrochloride.

6. An antihemorrhagic composition comprising an aqueous solution containing a water-soluble ammonium-type acid addition salt of 2-methyl-4-amino-1-naphthol as essential ingredient thereof.

7. An antihemorrhagic composition comprising a mineral acid salt of 2-methyl-4-amino-1-naphthol as essential ingredient thereof.

8. An acid addition salt of 2-methyl-4-amino-1-naphthol.

9. A mineral acid addition salt of 2-methyl-4-amino-1-naphthol.

WILBUR F. KAMM.
BENJAMIN F. TULLAR.